REFLECTANCE vs WAVELENGTH FOR PHOTOMASK BLANKS

TRANSMISSION SPECTRA OF TYPICAL FILM

United States Patent Office
3,822,155
Patented July 2, 1974

3,822,155
METHOD OF MAKING A SEMITRANSPARENT PHOTOMASK

Nathan Feldstein, Kendall Park, and Joel Alan Weiner, Cranbury, N.J., assignors to RCA Corporation, New York, N.Y.

Filed Jan. 22, 1973, Ser. No. 325,308
Int. Cl. C23f 1/02
U.S. Cl. 156—3 10 Claims

ABSTRACT OF THE DISCLOSURE

A method comprising electrolessly depositing a semitransparent film which is predominantly cuprous oxide on a transparent substrate and delineating a pattern in the film by etching.

BACKGROUND OF THE INVENTION

Figure 2:
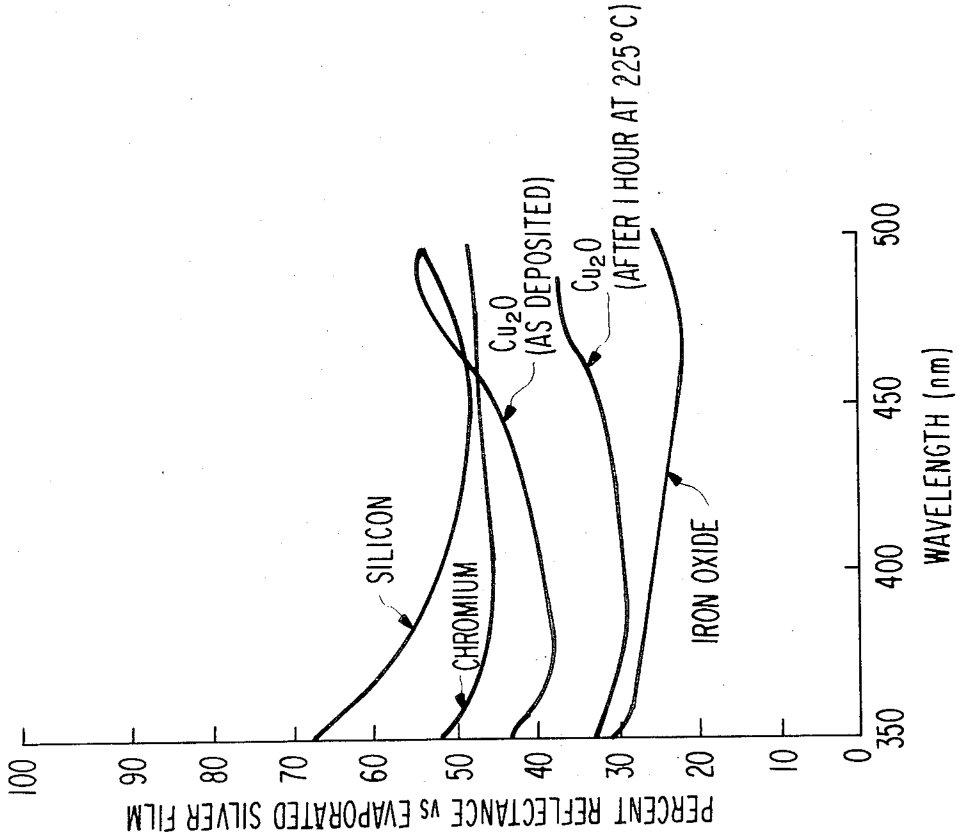

In the electronics industry and in other industries, photomasks are widely used in defining images on films of photosensitive material. In the past, the photomasks have usually comprised two principal types. One of these is a silver halide photographic gelatin emulsion on a glass substrate and the other is a patterned chromium film on a glass substrate.

In both types of masks, the opaque areas do not transmit either visible light or U.V. light. Photoresists are usually exposed with a U.V. light source. Since the opaque areas of the masks do not transmit visible light, exact positioning of the masks can be a serious problem, especially with positive type photoresists.

Besides the disadvantage of non-transmittal of visible light in the opaque areas, these former types of masks have other disadvantages. The photographic emulsion type masks are soft and hence are easily scratched. Dimensional changes take place when moisture is absorbed by the gelatin carrier. The gelatin material becomes fogged during the development process and this produces a significant optical density gradient around the edges of the opaque silver areas. This effect is due to a tapering of the silver concentration. Also, this type of mask is not suitable for fine-line definition due to its excessive thickness (about 4$\mu$).

Although chromium masks do not have the above disadvantages, they have certain others. Due to an aging phenomenon, etch time varies with different films of chromium even though all may have been prepared from the same batch of starting material. Chromium films have high reflectivity which results in multiple reflections when the masks are used in exposing a photosensitive material. This, in turn, causes poor edge definition in the developed photoresist film.

Due to the opaqueness of masks of the type described above, at the sodium D line (589 nm.), which makes registration with existing patterns difficult, attempts have been made to develop a semitransparent type mask. A preferred type of semitransparent mask should have the following characteristics.

1. The film should have virtually zero transmission in the wavelength region below 450 nm. This region (the U.V.) corresponds to the spectral range in which most commercial resists are sensitive.

2. For purposes of alignment, the film should be at least 30% transmitting in the 589 nm. region. This is the wavelength at which output of a sodium light is a maximum. Sodium light is usually used in the alignment process.

3. The deposited film should be readily etchable in etchants which do not attack commercial photoresists.

4. The deposited film should be abrasion-resistant so that it will not wear unduly when repeatedly brought into contact with a photoresist layer.

Several semitransparent masking materials and methods of depositing films of these semitransparent materials have been proposed. One of the more successful of these has been iron oxide deposited by sputtering. Despite the advantages of iron oxide films, they have not been widely used because their cost is about 7 to 10 times as great as that of the photoemulsion type mask.

Another proposed material is a so-called copper stain which is diffused into the surface of a glass substrate, as oxide, by an ion exchange method, and then reduced to elemental copper. This is described in U.S. Pat. 3,561,-963 to W. M. Kiba. This method of depositing this material is relatively complex and expensive.

Still another material which is commercially available from the Teltec Co. is a film of cuprous oxide deposited by sputtering.

THE DRAWING

Figure 1:
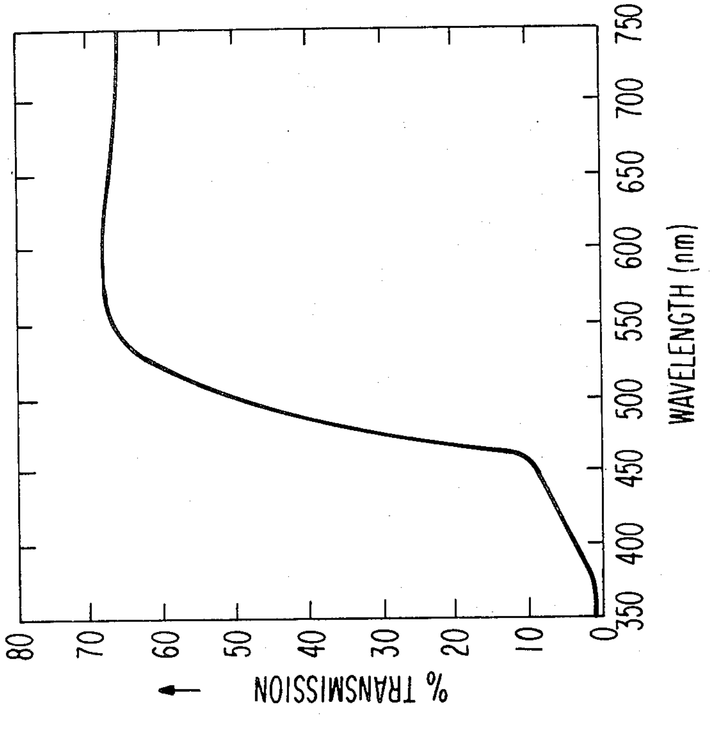

FIG. 1 is a curve of light transmission vs. wavelength for a typical film deposited by the method of the present invention, and FIG. 2 is a family of curves comparing reflectance of several types of films including films of the present invention and also showing the effect of making on reflectance characteristics of the present films.

DESCRIPTION OF PREFERRED EMBODIMENTS OF THE INVENTION

The present invention is a method of making a photomask by electrolessly depositing a thin film comprising predominantly cuprous oxide, preferably hardening the film and then delineating a pattern in the film by etching.

EXAMPLE 1

Although almost any substrate which is transparent to U.V. light may be used, this example includes use of a glass substrate. The glass substrate is cleaned in a conventional manner and is then successively sensitized and activated in a manner common to electroless deposition of metals such as nickel or copper onto dielectric substrates. A typical sensitizer solution may comprise 10 g./l. $SnCl_2 \cdot 2H_2O$ and 30 ml./l. of 37% conc. Hcl. A typical activator solution may comprise 1 g./l. of $PdCl_2$ and 1 ml./l. of 37% conc. HCl.

The cleaned substrate is successively dipped in the above solutions with thorough rinsing and drying between baths and rinsing and drying after immersion in the activator bath.

At the conclusion of the activation step, adsorbed palladium nuclei are present on the substrate surface. These nuclei provide catalytic sites for the initiation of the autocatalytic plating process which follows.

The following is a typical electroless copper plating bath which may be used in the present process.

| | M |
|---|---|
| $CuSO_4$ | 0.06 |
| Sodium salt of ethylenediaminetetraacetic acid ($Na_4 \cdot EDTA$) | 0.1 |
| NaOH (total alkalinity) | 1.0 |
| $NaH_2PO_2$ | 1.5 |

Temperature: 65° C.

When the activated glass substrate is immersed in this bath for 1 minute, a semitransparent yellow-colored film is deposited on the glass. Thickness of the film is about 600 A. Even if the substrate is left in the bath for periods of time longer than 1 minute, little or no further deposition appears to occur.

As shown in FIG. 1, the deposited film has a high degree of transmission in the visible range and a substantial decrease in transmission in the spectral region below 450 nm. It is this optical characteristic that is essential for semitransparent type photomasks. The low-transmission level in the spectral range below 450 nm. provides good light absorption for the actinic light used to expose most commercial photoresists.

Although it is not certain that the deposited film is 100% cuprous oxide, it is predominantly cuprous oxide. X-ray diffraction analysis and chemical analysis indicate that it is at least 90% cuprous oxide.

The film which has been described above can be etched with dilute solutions of ammonium hydroxide (5–10% by volume of 58% $NH_4OH$). Etch time for the 600 A. thick film is about 1 minute at room temperature. Good edge definition can also be obtained using dilute hydrochloric acid or ammonium persulfate solutions.

Some uses of photomasks require that they be highly scratch-resistant. When a photomask has this property, faithful replication can be achieved throughout a long series of printings. The present films, as deposited, are softer than masks composed of iron oxide. However, the present films can be made much more durable by baking them at temperatures of about 150°–250° C. for 30–60 minutes in air. Using this baking treatment, the cuprous oxide films become more scratch-resistant than conventional silver halide emulsion films although not as durable as iron oxide films. However, the process of the present invention greatly reduces the cost of photomasks compared to the cost of depositing iron oxide films or of depositing cuprous oxide films by a sputtering process. Also, large area films can be made more uniformly by electroless deposition than by sputtering and the film can more readily be deposited on selected areas.

If greater durability is required than can be achieved by baking the present films, the films can be covered with commercially available transparent film-forming materials that remedy the deficiency. Examples of such films are Scotch-Clad Strip Coating #2253, marketed by the 3M Company and Maskguard, marketed by Atomel Corp., Mill Valley, Calif.

As previously noted, another desirable property of photomask films is low surface reflectivity. Chromium films, for example, are especially poor in this respect. A secondary beneficial result of baking the present films is that their reflectivity decreases at the same time as their hardness increases. FIG. 2 is a family of curves comparing reflectance of films of several substances, including baked cuprous oxide and unbaked cuprous oxide, with an evaporated silver film used as a reference. As shown by these curves, a cuprous oxide film baked for 1 hour at 225° C. has much lower reflectance than a chromium film, at wavelengths from 350 to 500 nm. (and beyond 500 nm.).

Additional examples of electroless plating baths which can be used to practice the method of the present invention are given below.

EXAMPLE 2

| | |
|---|---|
| $CuSO_4$ | 0.06 M. |
| Sodium potassium tartrate | 0.17 M. |
| $NaH_2PO_2$ | 1.0 M. |
| pH (with NaOH) | 12.5 at 80° C. |
| Plating temperature | 80° C. |
| Plating time | 1 minute. |

EXAMPLE 3

| | |
|---|---|
| $CuSO_4$ | 0.06 M. |
| Propylene diamine tetraacetic acid (40% solution) | 0.1 M. |
| (Tetrasodium salt-containing less than 10% nitrilotriacetic acid) $NaH_2PO_2$ | 1.5 M. |
| NaOH (total alkalinity) | 1.0 M. |
| Plating temperature | 65° C. |
| Plating time | 1 minute. |

The next example is not as desirable as the preceding examples because care must be taken not to get reduction of some of the cuprous oxide to copper. However, with shorter plating time a satisfactory film of cuprous oxide can be obtained.

EXAMPLE 4

| | |
|---|---|
| $CuSO_4$ | 0.06 M. |
| Sodium potassium tartrate | 0.35 M. |
| NaOH | 0.15 M. |
| $H_2CO$ (37%) | 0.065 M. |
| Plating temperature | 70° C. |
| Plating time | 30 seconds. |

The following example also produces satisfactory films only if shorter plating times are used than for the sodium hypophosphite type bath.

EXAMPLE 5

| | |
|---|---|
| $CuSO_4 \cdot 5H_2O$ | 35 g./l. |
| Sodium potassium tartrate (with $4H_2O$) | 170 g./l. |
| NaOH | 50 g./l. |
| $Na_2SO_2O_4$ sodium dithionate | 10 g./l. |
| Plating temperature | 70° C. |
| Plating time | 30 seconds. |

EXAMPLE 6

Same as above except substitution of 2 g./l. of hydrazine sulfate $(NH_2)_2H_2SO_4$ instead of $Na_2S_2O_4$.

Although glass is a preferred substrate, transparent dielectric substances such as plastics which are not harmed by baking temperatures of up to about 250° C., can also be used.

We claim:

1. A method of making a semitransparent photomask comprising electrolessly depositing on a transparent substrate a film of a substance which is predominantly cuprous oxide having a thickness of at least about 600 A., and etching said film to delineate a pattern therein.

2. A method according to claim 1 in which the solution used to deposit said cuprous oxide contains a soluble copper salt, a complexing agent, a hypophosphite reducing agent and a pH adjusting agent to render the solution strongly alkaline.

3. A method according to claim 1 in which the etching agent to delineate said pattern is dilute hydrochloric acid.

4. A method according to claim 1 in which the etching agent to delineate said pattern is dilute ammonium hydroxide.

5. A method according to claim 1 in which said film is baked at a temperature of about 150°–250° C. for about 30 to 60 minutes.

6. A method according to claim 1 in which said substrate is glass.

7. A method of making a semitransparent photomask comprising: sensitizing and activating a surface of a transparent dielectric substrate, treating said surface with a solution comprising a soluble copper salt, a complexing agent, a pH adjusting agent to render the solution strongly alkaline and sodium hypophosphite for a period of time sufficient to deposit a film which is predominantly cuprous oxide having a thickness of about 600 A., and delineating a pattern in said film with an etchant.

8. A method according to claim 7 in which said cuprous oxide film is baked at a temperature of about 150°–250° C. to increase its hardness and lower its reflectance.

9. A method of making a semitransparent photomask comprising: sensitizing and activating a surface of a transparent, dielectric subtrate, treating said surface with a solution comprising a soluble copper salt, a complexing agent, a pH adjusting agent to render the solution strongly alkaline and a reducing agent selected from the class consisting of formic acid, sodium dithionate and hydrazine sulfate for about 30 seconds to deposit a semitransparent film of a substance that is predominantly cuprous oxide, and delineating a pattern in said film with an etchant.

10. A method according to claim 9 in which said substrate is glass and said film is baked in air to harden it.

References Cited

UNITED STATES PATENTS

| | | | |
|---|---|---|---|
| 3,642,476 | 2/1972 | Mesley | 117—54 X |
| 3,754,913 | 8/1973 | Takeuchi et al. | 96—36.2 |

WILLIAM A. POWELL, Primary Examiner

U.S. Cl. X.R.

117—8, 54; 156—7; 252—79.2, 79.5